US007840912B2

(12) United States Patent
Elias et al.

(10) Patent No.: US 7,840,912 B2
(45) Date of Patent: Nov. 23, 2010

(54) MULTI-TOUCH GESTURE DICTIONARY

(75) Inventors: John Greer Elias, Townsend, DE (US); Wayne Carl Westerman, San Francisco, CA (US); Myra Mary Haggerty, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 490 days.

(21) Appl. No.: 11/619,553

(22) Filed: Jan. 3, 2007

(65) Prior Publication Data

US 2007/0177803 A1    Aug. 2, 2007

Related U.S. Application Data

(60) Provisional application No. 60/763,605, filed on Jan. 30, 2006.

(51) Int. Cl.
*G06F 3/033* (2006.01)
(52) U.S. Cl. ....................... 715/863; 715/864
(58) Field of Classification Search ............... 715/863, 715/864; 382/126, 243
See application file for complete search history.

(56) References Cited

U.S. PATENT DOCUMENTS

| | | | | |
|---|---|---|---|---|
| 5,252,951 A * | 10/1993 | Tannenbaum et al. | ....... | 345/156 |
| 5,379,057 A | 1/1995 | Clough et al. | | |
| 5,483,261 A | 1/1996 | Yasutake | | |
| 5,488,204 A | 1/1996 | Mead et al. | | |
| 5,675,362 A | 10/1997 | Clough et al. | | |
| 5,825,352 A | 10/1998 | Bisset et al. | | |
| 5,835,079 A | 11/1998 | Shieh | | |
| 5,880,411 A | 3/1999 | Gillespie et al. | | |
| 6,147,678 A * | 11/2000 | Kumar et al. | ............... | 345/158 |
| 6,188,391 B1 | 2/2001 | Seely et al. | | |
| 6,310,610 B1 | 10/2001 | Beaton et al. | | |
| 6,323,846 B1 | 11/2001 | Westerman et al. | | |

(Continued)

FOREIGN PATENT DOCUMENTS

EP    689124 A1 * 12/1995

(Continued)

OTHER PUBLICATIONS

Wayne Westerman, Hand Tracking Finger Identification, and Chordic Manipulation on a multi-touch surface, Spring 1999, University of Delaware, pp. 1-333.*

(Continued)

*Primary Examiner*—Boris Pesin
*Assistant Examiner*—Shen Shiau
(74) *Attorney, Agent, or Firm*—Morrison & Foerster LLP

(57) ABSTRACT

A multi-touch gesture dictionary is disclosed herein. The gesture dictionary can include a plurality of entries, each corresponding to a particular chord. The dictionary entries can include a variety of motions associated with the chord and the meanings of gestures formed from the chord and the motions. The gesture dictionary may take the form of a dedicated computer application that may be used to look up the meaning of gestures. The gesture dictionary may also take the form of a computer application that may be easily accessed from other applications. The gesture dictionary may also be used to assign user-selected meanings to gestures. Also disclosed herein are computer systems incorporating multi-touch gesture dictionaries. The computer systems can include, desktop computers, tablet computers, notebook computers, handheld computers, personal digital assistants, media players, mobile telephones, and the like.

55 Claims, 6 Drawing Sheets

U.S. PATENT DOCUMENTS

| | | | |
|---|---|---|---|
| 6,337,678 | B1 | 1/2002 | Fish |
| 6,594,616 | B2 | 7/2003 | Zhang et al. |
| 6,690,387 | B2 | 2/2004 | Zimmerman et al. |
| 7,015,894 | B2 | 3/2006 | Morohoshi |
| 7,030,861 | B1* | 4/2006 | Westerman et al. ......... 345/173 |
| 7,184,064 | B2 | 2/2007 | Zimmerman et al. |
| 7,663,607 | B2 | 2/2010 | Hotelling et al. |
| 2002/0140718 | A1 | 10/2002 | Yan et al. |
| 2003/0222917 | A1 | 12/2003 | Trantow |
| 2004/0189720 | A1 | 9/2004 | Wilson et al. |
| 2004/0193413 | A1* | 9/2004 | Wilson et al. ............... 704/243 |
| 2005/0057524 | A1 | 3/2005 | Hill et al. |
| 2005/0210417 | A1 | 9/2005 | Marvit et al. |
| 2005/0212755 | A1 | 9/2005 | Marvit |
| 2006/0026521 | A1 | 2/2006 | Hotelling et al. |
| 2006/0026535 | A1 | 2/2006 | Hotelling et al. |
| 2006/0097991 | A1 | 5/2006 | Hotelling et al. |
| 2006/0101354 | A1* | 5/2006 | Hashimoto et al. .......... 715/863 |
| 2006/0125803 | A1* | 6/2006 | Westerman et al. ......... 345/173 |
| 2006/0197753 | A1 | 9/2006 | Hotelling |
| 2006/0209014 | A1* | 9/2006 | Duncan et al. .............. 345/156 |
| 2007/0177804 | A1 | 8/2007 | Elias et al. |
| 2008/0089587 | A1* | 4/2008 | Kim et al. ................... 382/190 |
| 2008/0158168 | A1 | 7/2008 | Westerman et al. |
| 2008/0158172 | A1 | 7/2008 | Hotelling et al. |
| 2008/0163130 | A1 | 7/2008 | Westerman |

FOREIGN PATENT DOCUMENTS

| | | |
|---|---|---|
| JP | 7-146750 A | 6/1995 |
| JP | 2000/163031 A | 6/2000 |
| JP | 2002-259046 A | 9/2002 |
| JP | 2002/342033 A | 11/2002 |
| JP | 2005-293061 A | 10/2005 |
| WO | WO-2006/094308 A2 | 9/2006 |
| WO | WO-2006/094308 A3 | 9/2006 |
| WO | WO-2008/085783 A1 | 7/2008 |
| WO | WO-2008/085784 A2 | 7/2008 |

OTHER PUBLICATIONS

International Search Report mailed May 14, 2008, for PCT Application No. PCT/US2007/089159, filed Dec. 28, 2007, two pages.

Anonymous. (2005). "Mouse Emulation—Gesture Guide," FingerWorks, located at <http://www.fingerworks.com/gesture_guide_mouse.html>, last visited Sep. 4, 2008, one page.

Anonymous. (2005). "MyGesture Editor —Gesture Mapping," located at <http://www.fingerworks.com/MyGestureEditor_mapping.html>, last visited Jan. 8, 2009, five pages. (XP002511130).

Anonymous. (Nov. 26, 2005). "MyGesture Editor—Gesture Mapping," located at <http://web/archive.org.web/20051126023354/http://www.fingerworks.com/MyGestureEditor_mapping.html>, last visited Jan. 8, 2009, four pages (XP002509466).

International Search Report mailed Jan. 29, 2009, for PCT Application No. PCT/US2007/089161, filed Dec. 28, 2007, four pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action mailed Apr. 27, 2010, for U.S. Appl. No. 11/619,571, filed Jan. 3, 2007, 20 pages.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Anonymous. (2005). "Mouse Emulation—Gesture Guide," FingerWorks, located at <http://www.fingerworks.com/gesture_guide_mouse.html>, last visited Sep. 4, 2008, one page.

Anonymous. (2005). "MyGesture Editor—Gesture Mapping," located at <http://www.fingerworks.com/MyGestureEditor_mapping.html>, last visited Jan. 8, 2009, five pages. (XP002511130).

Anonymous. (Nov. 26, 2005). "MyGesture Editor—Gesture Mapping," located at <http://web/archive.org.web/20051126023354/http://www.fingerworks.com/MyGestureEditor_mapping.html>, last visited Jan. 8, 2009, four pages. (XP002509466).

International Search Report mailed Jan. 29, 2009, for PCT Application No. PCT/US2007/089161, filed Dec. 28, 2007, four pages.

* cited by examiner

MULTI-TOUCH GESTURE DICTIONARY

CROSS-REFERENCE TO RELATED APPLICATIONS

This claims priority to U.S. Provisional Application No. 60/763,605, titled "Gesturing With a Multipoint Sensing Device," filed Jan. 30, 2006, which is hereby incorporated by reference in its entirety.

This is related to the following U.S. Patents and Patent Applications, each of which is also hereby incorporated by reference in its entirety:

- U.S. Pat. No. 6,323,846, titled "Method and Apparatus for Integrating Manual Input," issued Nov. 27, 2001;
- U.S. patent application Ser. No. 10/840,862, titled "Multipoint Touchscreen," filed May 6, 2004;
- U.S. patent application Ser. No. 10/903,964, titled "Gestures for Touch Sensitive Input Devices," filed Jul. 30, 2004;
- U.S. patent application Ser. No. 11/038,590, titled "Mode-Based Graphical User Interfaces for Touch Sensitive Input Devices," filed Jan. 18, 2005;
- U.S. patent application Ser. No. 11/367,749, titled "Multi-Functional Hand-Held Device," filed Mar. 3, 2006; and
- U.S. Pat. No. 7,030,861, titled "System and Method for Packing Multi-Touch Gestures Onto a Hand," issued Apr. 18, 2006.
- U.S. patent application Ser. No. 11/619,571, titled "Multi-Touch Gesture Dictionary," filed concurrently herewith.

BACKGROUND

Many attempts have been made over the years to improve the way users interact with computers. In the beginning, cards or tapes with punched holes were used for user input. Punch cards gave way to terminals with alphanumeric keyboards and text displays, which evolved into the modern keyboard, mouse, and graphical-display based graphical user interfaces. Many expect that the use of multi-finger, touch-sensitive user interfaces ("multi-touch interfaces", such as those described in the references incorporated above, will become widely adopted for interacting with computers and other electronic devices, allowing computer input to become even more straightforward and intuitive.

Users of these multi-touch interfaces may make use of hand and finger gestures to interact with their computers in ways that a conventional mouse and keyboard cannot easily achieve. A multi-touch gesture can be as simple as using one or two fingers to trace out a particular trajectory or pattern, or as intricate as using all the fingers of both hands in a complex sequence of movements reminiscent of American Sign Language. Each motion of hands and fingers, whether complex or not, conveys a specific meaning or action that is acted upon by the computer or electronic device at the behest of the user. The number of multi-touch gestures can be quite large because of the wide range of possible motions by fingers and hands. It is conceivable that an entirely new gesture language might evolve that would allow users to convey complex meaning and commands to computers and electronic devices by moving their hands and fingers in particular patterns.

SUMMARY

The present invention can relate, for example, to dictionary of multi-touch gestures that is interactively presented to a user of a computer system having a multi-touch user interface. In one embodiment, the dictionary may take the form of a dedicated computer application that identifies a chord (e.g., a combination of fingers, thumbs, and/or other hand parts) presented to the multi-touch interface by the user and displays a dictionary entry for the identified chord. The dictionary entry may include, for example, visual depictions of one or more motions that may be associated with the chord and meanings of the gestures including the identified chords and the various motions. The visual depictions may take the form of motion icons having a graphical depiction of the motion and a textual description of the meaning of the gesture. The visual depictions may also take the form of animations of the one or more motions. The application could also identify one or more motions of the chord by the user and provide visual and/or audible feedback to the user indicating the gesture formed and its meaning.

In another embodiment, a dictionary application can run in the background while other applications on the computer systems are used. If a user presents a chord associated with a gesture without a motion completing the gesture, the dictionary application can present a dictionary entry for the presented chords. As in other embodiments, the dictionary entry may include visual depictions of one or more motions and meanings of the gestures comprising the identified chord and the various motions. Also as in other embodiments, the visual depictions may take the form of motion icons or animations of the motions. A user guided by the dictionary entry may perform a motion completing a gesture, and the system may execute a meaning of the gesture and may also provide visual and/or audible feedback indicating the meaning of the gesture.

In another embodiment of the present invention an interactive computer application that allows a user to assign meanings to multi-touch gestures is provided. The computer application may display a dictionary entry (like those described above, for example) and accept inputs from the user to assign a meaning to one or more of the gestures in the dictionary entry. The application may be used to assign meanings to gestures that do not have default meanings selected by a system designer or may be used to change the meanings of gestures that do have default meanings assigned by a system designer. The application may also include program logic to selectively present only those motions that may be more easily performed in a form different from those motions that may be more difficult to perform. Alternatively, the more difficult motions may not be displayed at all. In some embodiments, this feature may be overridden by the user.

In other embodiments, gesture dictionary applications may be triggered by events other than presentation of a chord. These events may include hand parts hovering over a multi-touch surface, audible events (for example, voice commands), activation of one or more buttons on a device, or applying a force and/or touch to a force and/or touch sensitive portion of a device. These events may correspond to chords and invoke a dictionary entry corresponding to such a chord. Alternatively or additionally, these events may correspond to other groupings of gestures not based on chords, such as custom dictionary entries. In yet another variation, the event triggering a gesture dictionary application may not correspond to a gesture grouping at all. In these cases, a dictionary index may be invoked, allowing a user to select from a plurality of dictionary entries.

In yet another embodiment according to this invention, computer systems including one or more applications are provided. A computer system may take the form of a desktop computer, notebook computer, tablet computer, handheld computer, personal digital assistant, media player, mobile telephone, or the like.

BRIEF DESCRIPTION OF THE DRAWINGS

The aforementioned and other aspects of the invention may best be understood by reference to the following description taken in conjunction with the accompanying drawings in which.

DETAILED DESCRIPTION

Figure 1:
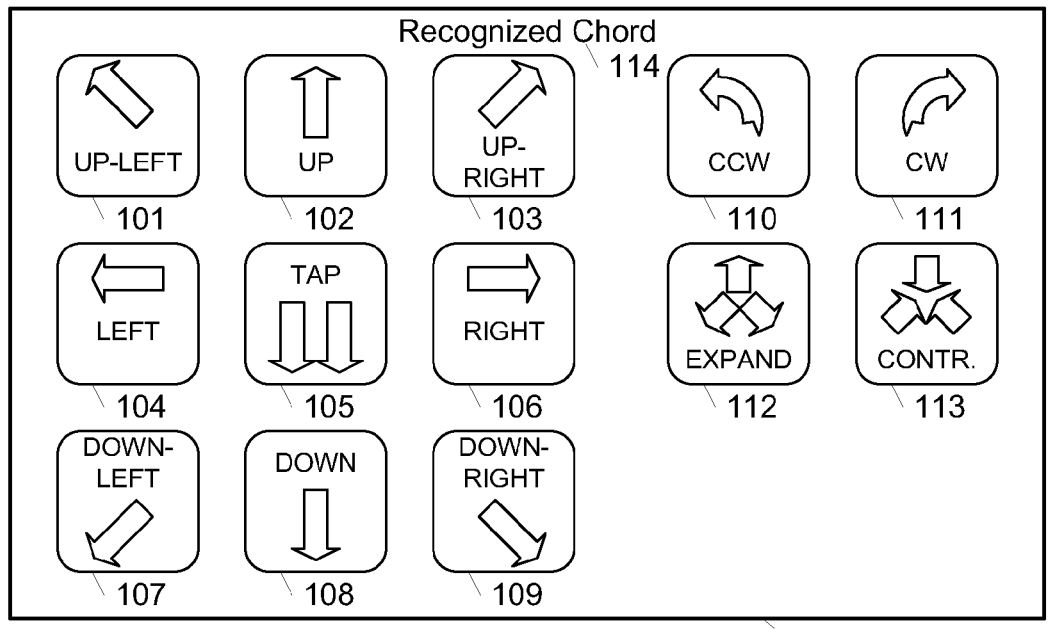
FIG. 1 illustrates a gesture dictionary template that may be used in accordance with some embodiments of the present invention.

To take full advantage of a multi-touch gesture language, users will need to learn and/or remember the meaning of numerous gestures. One learning or trying to remember the meaning of words in a verbal language often makes use of a dictionary, essentially a list of words and their associated meanings. In an analogous manner, one learning or trying to remember the meaning of gestures could consult a gesture dictionary, e.g., a list of gestures and their associated meanings.

Although it is possible to learn and/or look up the meanings of gestures using a gesture dictionary formed around verbal descriptions, this may not be efficient for at least three reasons. First, the gesture itself may not be known to the user. Second, the meaning of the gesture may change as a function of the context in which it is performed. Third, the index of possible gestures may not be easily describable in words, thus making searching a verbal index cumbersome.

Furthermore, learning a multi-touch gesture language may be facilitated by having a gesture dictionary that provides some type of demonstration of the expected hand and finger motion. Similarly, remembering a previously learned gesture's meaning may also be benefited by having some way to easily access the meaning associated with the particular gesture.

Therefore, disclosed herein is a gesture dictionary that facilitates the learning and retention of the meanings or definitions of gestures that make up a multi-touch gesture language by providing demonstration of expected hand and finger motions. The gesture dictionary disclosed herein further allows looking up or accessing the meaning of gestures in a quick and easy manner that does not depend on verbal indexing.

Multi-touch gestures may be considered to include at least two phases that, taken together in sequence, signal the beginning and completion of a particular gesture. The first phase of a multi-touch gesture can include presenting a specific combination of hand parts, i.e., fingers, thumbs, etc. in a particular configuration. In some embodiments, this may include placing the hand parts down on the multi-touch surface. The second phase of the gesture can include, for example, motion of the specific hand parts. This motion may take the form of lateral motions such as rotation, translation, scaling (expansion and contraction), etc. Again, in some embodiments, this may comprise moving the hand parts around on the multi-touch surface. In such embodiments, the second phase of the gesture may also comprise vertical motions (relative to the multi-touch surface) such as tapping, double-tapping, etc.

For convenience, the first phase, e.g., the starting position, number, and configuration of all the hand parts used for a particular gesture, will be referred to herein as a chord. Also for convenience, the hand parts will be referred to as fingers, although this also includes thumbs, palm heels, etc. Therefore, in the examples described herein, a chord can include a set of fingers from either or both hands that initially contact a multi-touch surface prior to motion on the multi-touch surface. In many multi-touch systems the chord may uniquely specify a set of gestures that belong to the combination of fingers and orientations making up the chord.

Each of a user's hands can execute twenty-five or more chords. For example, five fingers that can be independently raised or lowered give rise to twenty-five combinations. Additional chords may be distinguished by whether only the fingertips are in contact with the surface or whether the length of the finger is flattened against the surface. Further chords may be distinguished based on whether the fingertips are placed on the surface close together or spread apart. Still other distinctions may be possible. For example, modifier keys (e.g., the Ctrl, Alt, Shift, and Cmd keys of a keyboard) may be used to distinguish different chords. The modifier keys may include keys on a conventional keyboard or may include buttons or touch or force sensitive areas or other toggles located on the device. However, some of these chords may be more difficult to execute than others, and various identification and classification problems can arise for the device, particularly in the case of closed versus spread fingertips.

Many chords can have at least thirteen different motions associated with them. For example, a two-finger chord (for example, the index and middle fingers) could have specific meaning or action assigned to the lateral motions that include rotation, translation, and scaling. Rotation (clockwise and counter-clockwise) of the two-finger chord gives rise to two unique meanings or actions. Translation (left, right, up, down, and four diagonals) gives rise to at least eight unique meanings or actions. Scaling (contraction or expansion) also gives rise to two meanings or actions. The vertical motion of a chord may comprise lifting the fingers of the chord off the multi-touch surface almost immediately after they had touched down, (e.g., tapping the multi-touch surface with the chord) or multiple taps, etc.

With each hand able to execute twenty-five or more chords, and with each chord having thirteen or more motions associated therewith, there may be over three hundred possible gestures for each hand. Many more gestures are possible if both hands are used together. This gives rise to the gesture language referenced above.

One approach to creating a gesture dictionary indexes the dictionary using the chords, much as a textual dictionary uses the alphabet. For example, just as there may be a particular number of words that start with a particular letter, so there may be a particular number of gestures that start with a particular chord. These gestures may be presented to a user in a way that facilitates rapid assimilation by the user. For example, template 100 for a combination graphical and textual dictionary entry for a given chord is illustrated in FIG. 1.

Template 100 can include an indication 114 of a given chord and a plurality of indications 101-113 corresponding to motions associated with the given chord, which may be called motion icons. In this example, the motions include translation upward and to the left 101, translation upward 102, translation upward and to the right 103, translation to the left 104, tapping 105, translation to the right 106, translation downward and to the left 107, translation downward 108, translation downward to the right 109, counter-clockwise rotation 110, clockwise rotation 111, expansion 112, and contraction 113. Other motions can also be included in template 100. Alternatively, motions that may not apply to a given chord or that may be difficult to execute with a given chord can be omitted. The arrangement of the motion icons may be organized in a logical and consistent manner for all of the dictionary entries so as to provide the user with a basically constant layout, which allows the user to always know where to look to get the meaning of a gesture.

Each of FIGS. 2-5 shows an exemplary dictionary entry for four different chords. In each of these exemplary dictionary entries, the textual descriptions of the motions from the template of FIG. 1 are replaced with the "meaning" of a particular gesture. The meanings may take the form of commands, strings of commands, or other activities such as entry of particular text, etc.

Figure 2:
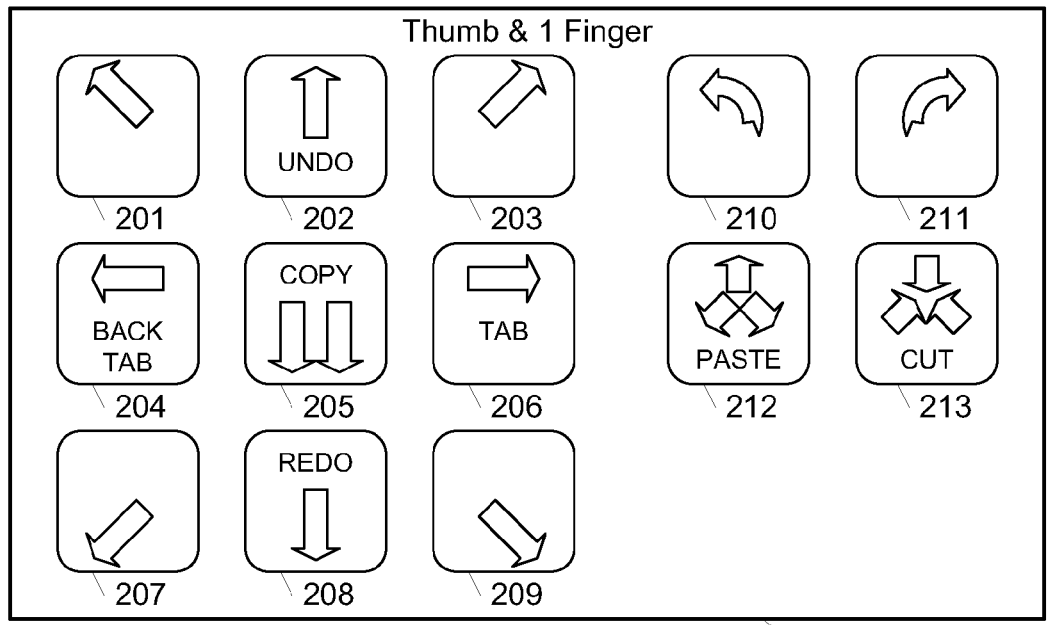
FIG. 2 illustrates an exemplary dictionary entry associated with a thumb and one finger chord that may be used in accordance with some embodiments of the present invention.

FIG. 2 illustrates dictionary entry 200 for commands that may be associated with gestures starting with a "thumb and one finger" chord. Specifically, a thumb and one finger chord followed by upward motion 202 can correspond to an undo command. Similarly, a thumb and one finger chord followed by downward motion 208 can correspond to a redo command. It should be noted that it may aid users' attempts to learn and remember gestures for complementary commands to have complementary motions associated with them in this manner. Other commands that can correspond to the thumb and one finger chord include tab (associated with rightward motion 206), back tab (associated with leftward motion 204), copy (associated with tap 205), cut (associated with contraction 213, e.g., a pinching motion), and paste (associated with expansion 212, e.g., the reverse of a pinching motion).

As seen in FIG. 2, certain motions of the thumb and one finger chord do not have a command associated with them, e.g., upward left motion 201, upward right motion 203, downward left motion 207, downward right motion 209, counter-clockwise rotation 210, and counterclockwise rotation 211. In some embodiments, the gesture dictionary may be used to assign commands to these gestures as described in greater detail below.

Figure 3:
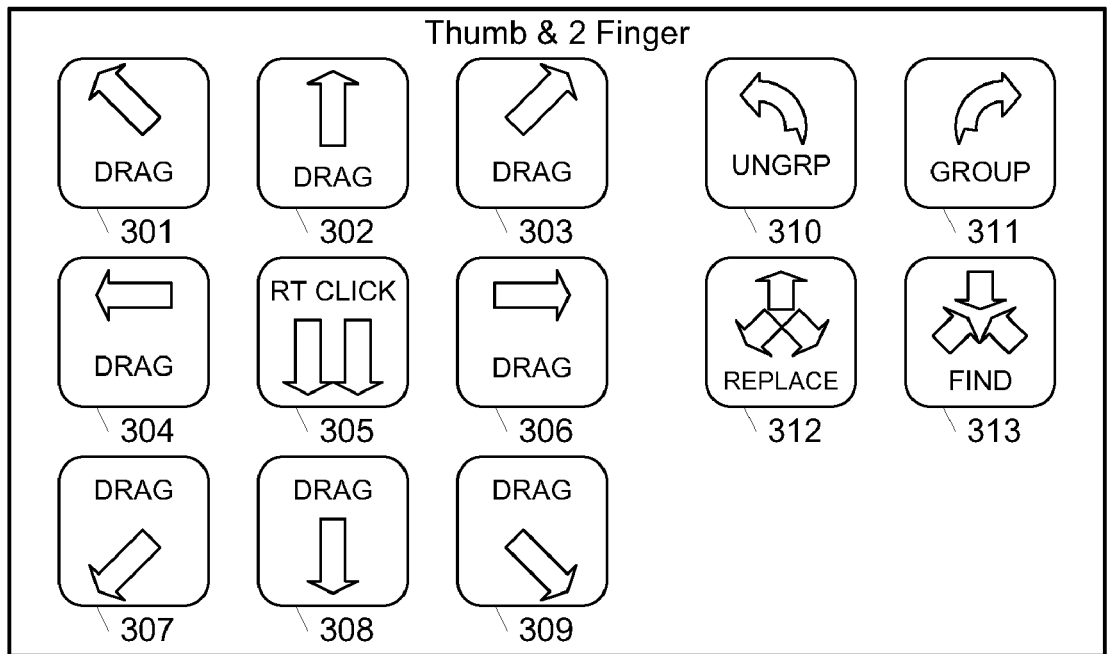
FIG. 3 illustrates an exemplary dictionary entry associated with a thumb and two finger chord that may be used in accordance with some embodiments of the present invention.

FIG. 3 illustrates exemplary dictionary entry 300 for commands that may be associated with gestures starting with a "thumb and two finger" chord. In this example, the standard thumb and two finger chord followed by any translational motion (i.e., translation upward and to the right 301, translation upward 302, translation upward and to the left 303, translation to the left 304, translation to the right 306, translation downward and to the left 307, translation downward 308, and translation downward and to the right 309) may be associated with a dragging operation as might be accomplished in conventional graphical user interface ("GUI") systems by holding a mouse button while moving the mouse. Tap 305 of the thumb and two finger chord may correspond to a right click command. Counter clockwise rotation 310 or clockwise rotation 311 following a thumb and two finger chord may correspond to group and ungroup commands, respectively. Expansion 312 and contraction 313 of the thumb and two finger chord may correspond to replace and find commands, respectively.

Figure 4:
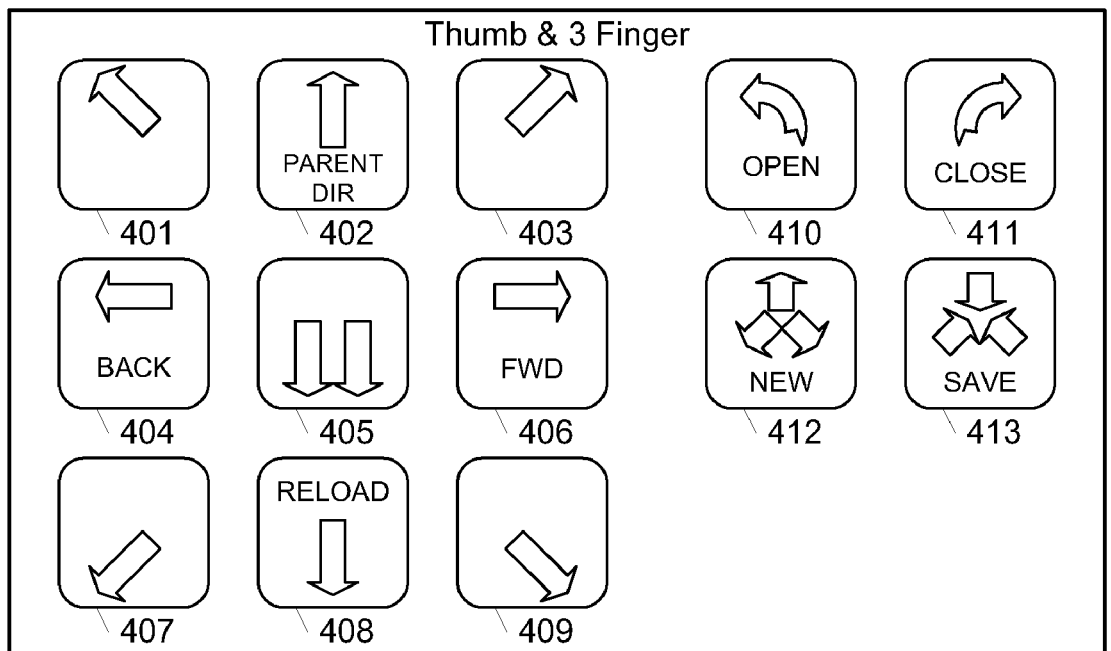
FIG. 4 illustrates an exemplary dictionary entry associated with a relaxed thumb and three finger chord that may be used in accordance with some embodiments of the present invention.

FIG. 4 illustrates dictionary entry 400 for commands that may be associated with gestures starting with a standard "thumb and three finger" chord, as distinguished from a spread "thumb and three finger" chord, described below in connection with FIG. 5. In the given example, the standard thumb and three finger chord followed by upward motion 402 can correspond to a parent directory command, i.e., moving up a directory level in a file browser or similar application. A standard thumb and three finger chord followed by downward motion 408 can correspond to a reload command, as would be used in a web browser application, for example. Continuing with command that might be associated with browser-type applications, left translation 404 or right translation 406 may correspond to back and forward commands common in browser applications. Other commands that can correspond to the thumb and three finger chord include open and close, corresponding to counter-clockwise rotation 410 and clockwise rotation 411, and new and save, corresponding to expansion 412 and contraction 413.

Figure 5:
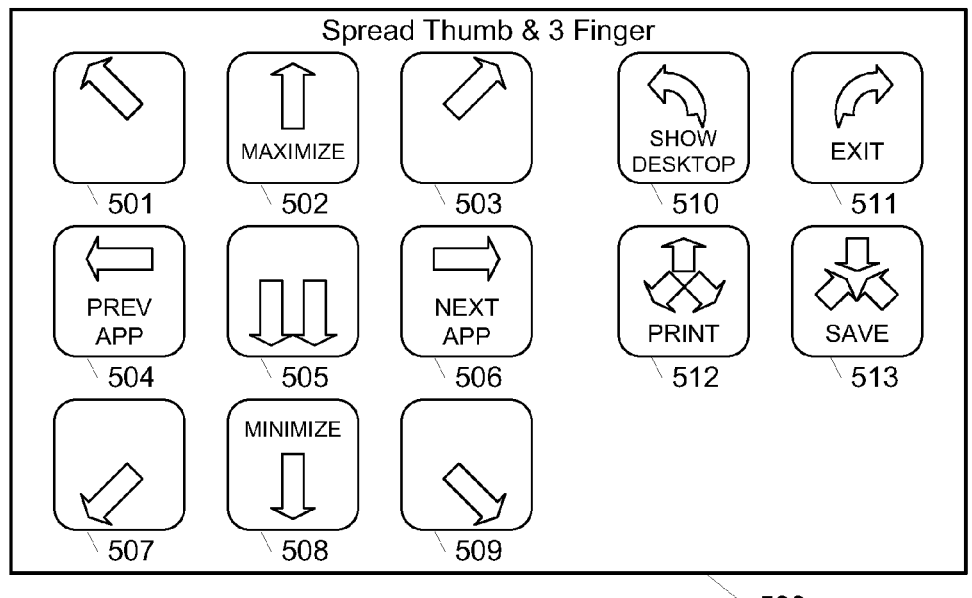
FIG. 5 illustrates an exemplary dictionary entry associated with a spread thumb and three finger chord that may be used in accordance with some embodiments of the present invention.

FIG. 5 illustrates dictionary entry 500 for commands that may be associated with gestures starting with a spread "thumb and three finger" chord. The distinctions between spread chords and standard chords are described, for example, in U.S. Pat. No. 7,030,861, which is incorporated by reference. In brief, a spread chord may be executed with the fingers making up the chord (in this case a thumb and three fingers, e.g., the index, middle, and ring fingers) substantially spread apart. Conversely, a standard chord may be executed with the fingers making up the chord in a neutral, relaxed posture.

In the example of FIG. 5, a spread thumb and three finger chord may be associated primarily with GUI-related commands. For example, downward motion 508 can correspond to a minimize command, upward motion 502 can correspond to a maximize command (as would be used with a GUI window). Other GUI-related commands that may be assigned to spread thumb and three finger chords include: next application (associated with rightward motion 406), previous application (associated with leftward motion 404), show desktop, i.e., minimize all windows (associated with counter-clockwise rotation 510), exit, i.e., close application, (associated with clockwise rotation 511).

The previous application and next application commands, discussed above, may be executed in many popular GUI environments by using an Alt modifier key followed by a Tab key (for next application) or Alt and Shift modifier keys followed by a Tab key (for previous application). The motions associated with these commands (left and right translation 504 and 506) correspond to the motions of the thumb and one finger chord used for the tab and back tab commands in the example discussed above with respect to FIG. 2. This type of association may be beneficial to users attempting to learn and remember multi-touch gesture languages.

Figure 8:
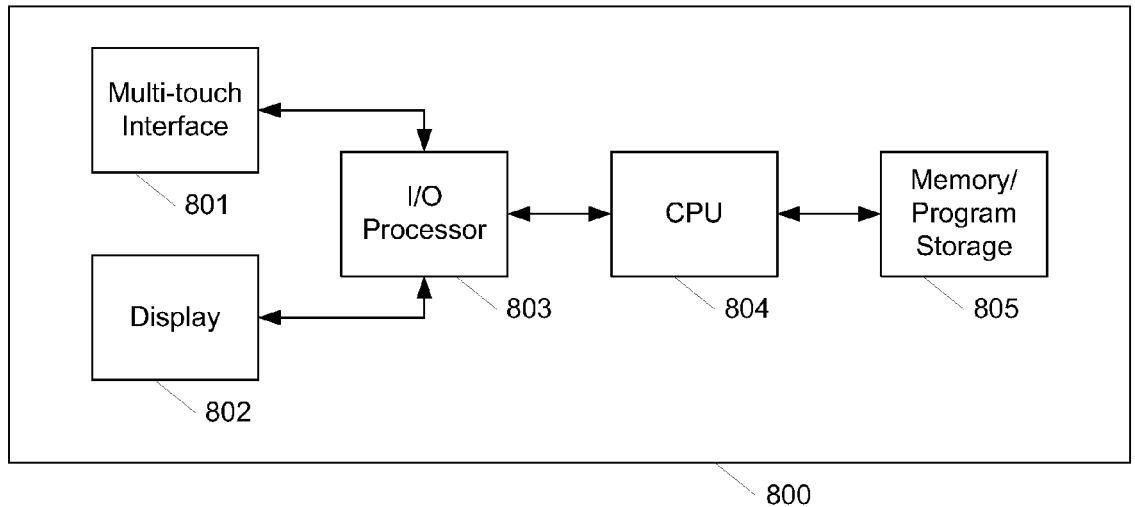
FIG. 8 illustrates a simplified block diagram of a computer system implementing one or more embodiments of the present invention.

Having described a format for a gesture dictionary, the following describes how a user may access and interact with such a gesture dictionary. In some embodiments, a gesture dictionary application program may be provided on a computer system the multi-touch gestures interact with. An example computer system 800 is illustrated in the simplified schematic of FIG. 8. The program may be stored in a memory 805 of the computer system, including solid state memory (RAM, ROM, etc.), hard drive memory, or other suitable memory. CPU 804 may retrieve and execute the program. CPU 804 may also receive input through a multi-touch interface 801 or other input devices not shown. In some embodiments, I/O processor 803 may perform some level of processing on the inputs before they are passed to CPU 804. CPU 804 may also convey information to the user through display 802. Again, in some embodiments, an I/O processor 803 may perform some or all of the graphics manipulations to offload computation from CPU 804. Also, in some embodiments, multi-touch interface 801 and display 802 may be integrated into a single device, e.g., a touch screen.

Figure 10:
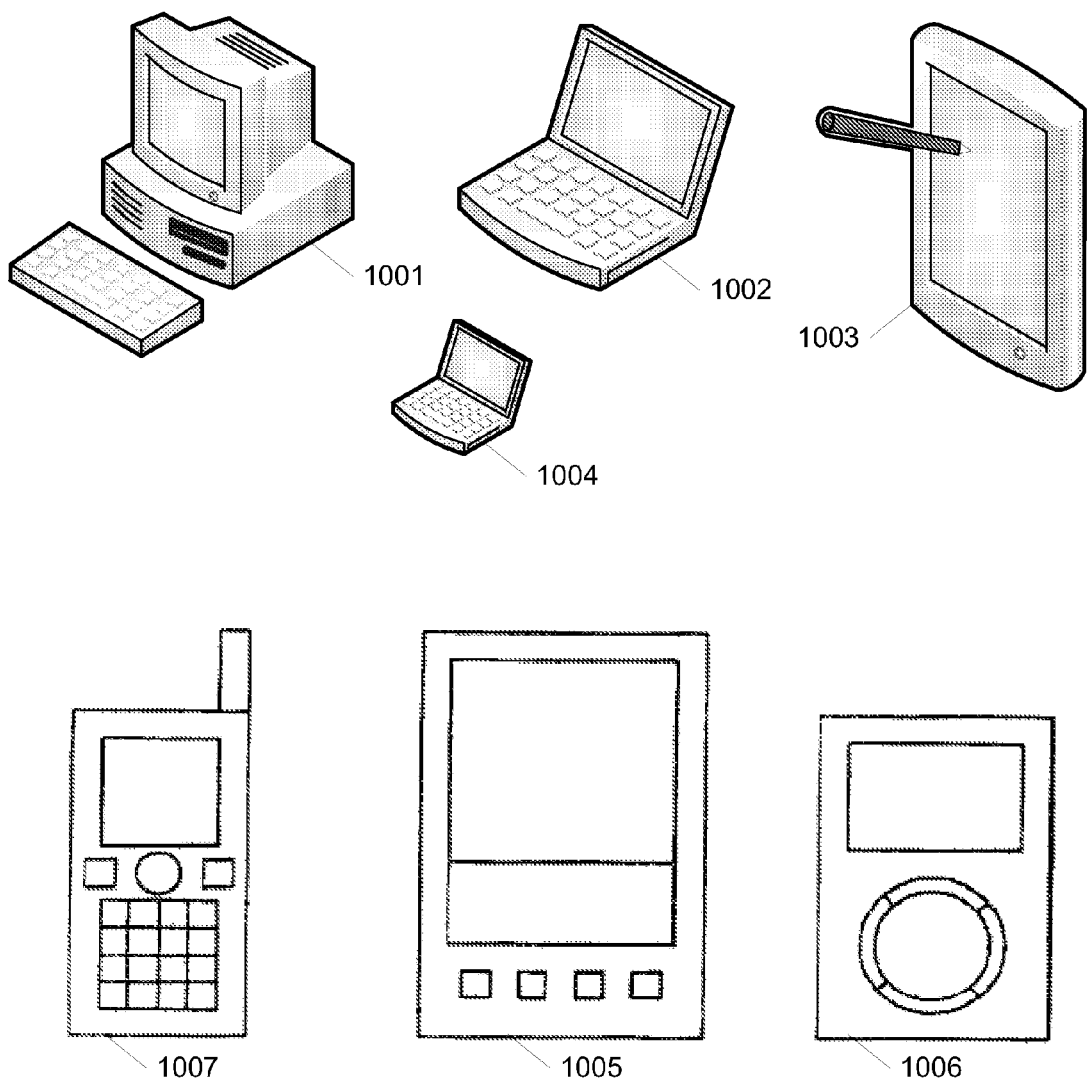
FIG. 10 illustrates various computer form factors that may be used in accordance with embodiments of the present invention.

The computer system may be any of a variety of types illustrated in FIG. 10, including desktop computers 1001, notebook computers 1002, tablet computers 1003, handheld computers 1004, personal digital assistants 1005, media players 1006, mobile telephones 1007, and the like. Additionally, the computer may be a combination of these types, for example, a device that is a combination of a personal digital assistant, media player, and mobile telephone. The gesture dictionary application may be started by a user using any of a variety of techniques common in GUI-based computer systems. Once the application is accessed, the user can present a chord to the system without performing any motion associated with the chord. Presentation of the chord may cause the application to display a dictionary entry, such as those described above.

Furthermore, performance of a motion associated with the chord may cause feedback to the user indicating the gesture and/or the associated command performed. For example, if the user presents a two finger chord a dictionary entry like that in FIG. 2 may be displayed. If a contraction or pinching motion is performed, PASTE command entry 212 may be highlighted to indicate what gesture the user performed and what command is associated therewith. Alternatively, other forms of feedback, including audible, visual, or audiovisual feedback could also be used. Audible feedback may include, for example, speaking a meaning associated with the chord.

In further variations of this embodiment, performing a subsequent motion could cause other entries to be highlighted or the gesture/command associated therewith to be otherwise indicated to the user. Alternatively, presenting a different chord (e.g., by putting down or lifting an additional finger or fingers) could cause a different dictionary entry, associated with the newly presented chord, to be displayed. Still another alternative would be for the computer system to perform the meaning of the gesture after providing feedback to the user. Yet another alternative would be for the computer system to dismiss the display in response a liftoff of the chord. Such a gesture dictionary application could allow a user to explore the various chords and motions associated with the chords to learn and/or practice gestures.

Because of the relatively large number of possible gestures, and the fact that gestures may be strung together to create new, compound gestures, the number of gestures may greatly exceed the number of input commands, etc. needed by a system designer. Thus, these additional gestures could be used by the end-user to create custom commands or other interactions. Additionally, a user may desire to re-program particular gestures to suit his particular purposes. Another use of such a dictionary is to facilitate the process of mapping gestures to custom, user-defined functions by assigning meanings to gestures.

Assigning meanings to gestures may be done in a variety of ways. For example, in the dictionary entry FIG. 2, no commands are necessarily associated with the gestures comprising clockwise or counter-clockwise rotation of the thumb and one finger chord. The gesture dictionary application may be programmed to allow a user to select these and other "unassigned" gestures and assign meanings to them. In short, the assignment of meanings to particular gestures may be analogized to the way "macros" are created in various computer applications. The ability to assign meanings to gestures need not be limited to gestures that do not have a default meaning associated with them. The gesture dictionary application may allow the meanings of gestures to be changed to suit a user's preference.

Figure 7:
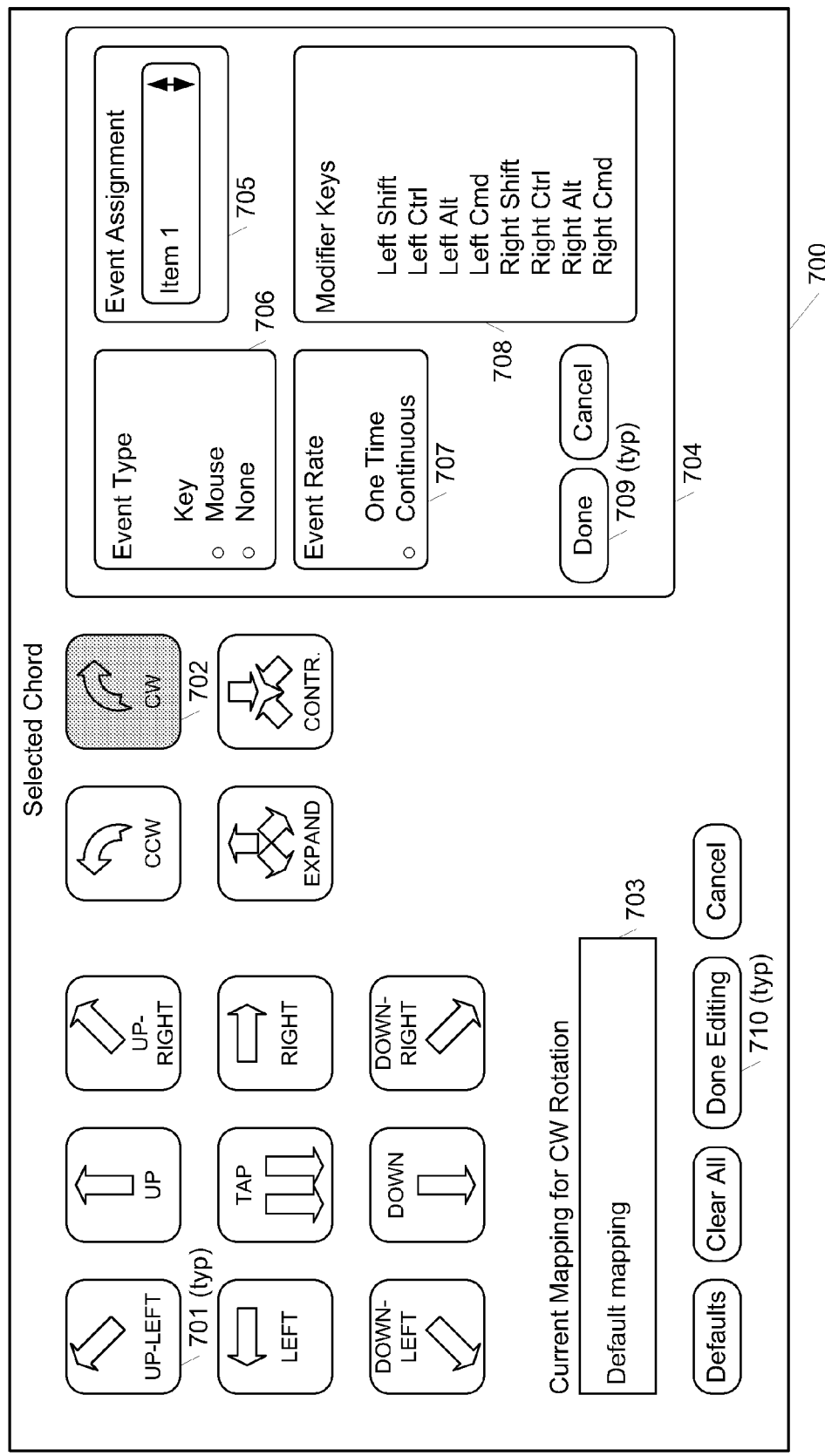
FIG. 7 illustrates a user interface display for a gesture editing application that may be an embodiment of the present invention.

FIG. 7 illustrates an exemplary user interface display for a gesture dictionary application that may be used for assigning meanings to gestures. As in the examples discussed above, the display for a particular chord may include plurality of motion icons 701. Particular motion icon 702 corresponding to the gesture currently being edited may be highlighted or otherwise indicated in some way to provide indication to the user of the gesture currently being edited. Dialog box 703 may show, for example, whether the meaning associated with the particular motion (gesture) is the default or a custom mapping. A plurality of GUI buttons 710 may also be provided so that a user can indicate the assignment of a meaning to a gesture is completed ("Done"), cancel the assignment of a meaning to a gesture ("Cancel"), restore the default meanings, or clear all of the custom meanings.

Event editor box 704 may allow the user to further specify meanings to be associated with the gesture. An event type may be selected using event type selection box 706. Event types may be, for example, a key event, a mouse event, or neither. The selection may be made using radio buttons in the event type selection box 706. Once an event type has been selected, for example a key event, whether the event is a one time event, i.e., a single key press, or a continuous event, i.e., holding the key may be selected, for example, using radio buttons in Event Rate selection box 707. For key events, modifier keys, may also be selected using check boxes associated with each of the possible modifier keys, for example, those on an Apple keyboard. Alternatively, the application may be configured to capture keystrokes, including modifiers, etc., performed by the user on a keyboard. An event may be selected from the pull down box 705. The event editor box 704 may also include GUI buttons 709 allowing a user to indicate that he is done assigning the event type or cancel the assignment of an event type.

In another variation of the meaning assignment application of a gesture dictionary, the motions associated with each dictionary entry may be intelligently controlled by program logic in the gesture dictionary application to present to a user only those motions that may be easily performed for a given chord or to present motions that may be easily performed in a manner different from motions that may be less easily performed. It may be desirable to allow a user to manually override this determination so that a particularly dexterous user could assign meanings to chords not easily performable by others. This may take the form of motions that are presented as grayed-out boxes if that motion might be considered awkward or difficult for typical users. It could also take the form of a list of motions in addition to those presented in a particular entry that may be added to the entry by the user. Other variations are also possible.

As an alternative or supplement to the dedicated gesture dictionary application described above, it may be desirable for a user to access the gesture dictionary quickly from a program application being used to perform a particular task, i.e., not a dedicated dictionary application. For example, a user may desire to perform a particular command in the program application, but may not remember the gesture associated with the command or may remember the chord but not the motion making up the gesture. Thus, another embodiment of the gesture dictionary may take the form of a background program that presents a dictionary entry associated with a chord if that chord is presented without any of the motions associated with that chord being performed within a predetermined time delay. A dictionary entry may also be presented if a gesture is performed that does not have a meaning associated with it (e.g., the thumb and one finger chord followed by rotation discussed above) or if a gesture is performed that, as determined by program logic, does not make sense in the particular context.

The time delay may prevent a gesture dictionary entry from being presented to the user every time a gesture is performed, which could be an annoyance or distraction. However, in some modes of operation this time delay could be omitted or substantially shortened. For example, it may be beneficial to a beginning multi-touch gesture user to have the dictionary entries displayed after every chord as a learning reinforcement mechanism.

Figure 6:
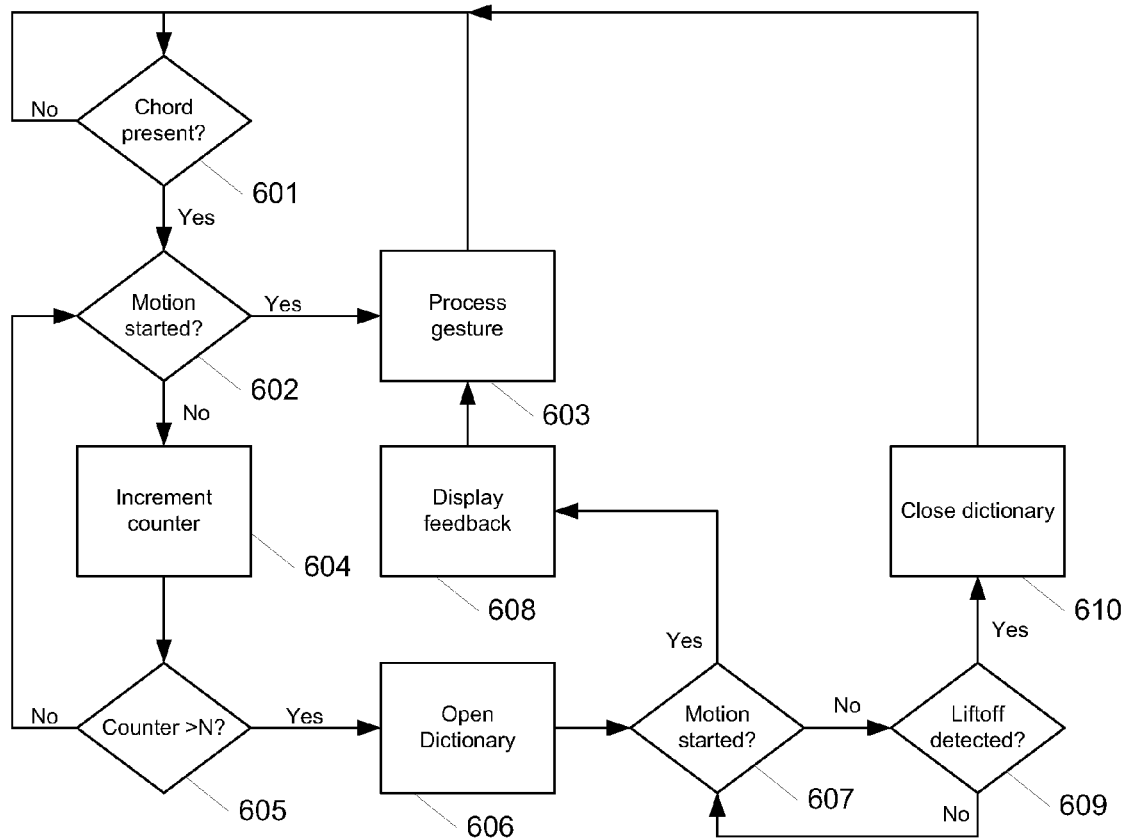
FIG. 6 illustrates a simplified flow chart of a computer application implementing a gesture dictionary in accordance with some embodiments of the present invention.

The flow chart in FIG. 6 shows the steps of accessing the gesture dictionary from another application as described above. The multi-touch system may continuously monitor the multi-touch surface looking for the presence of a chord (601). When a chord is detected the system may monitor the positions of the fingers making up the chord looking for lateral or vertical motion on the surface (602). Each time the system checks for motion and there is none, a counter may be incremented before the system checks for motion again (604). If motion is detected before the counter reaches a predetermined value N then the combination of chord and motion (i.e., the gesture) may be processed and the current meaning or action associated with the gesture may be executed (603). If, however, motion is not detected by the time the counter reaches the value N (605), then the system may open the gesture dictionary to the entry corresponding to the chord being presented by the user (606). The counter thus implements the time delay function discussed above.

Once the dictionary application is opened (606), the system may determine whether a motion has started (607). If so, the application may temporarily display feedback associated with the gesture (608), e.g., highlight a motion icon associated with the gesture, and then process the gesture, e.g., execute the meaning or action associated with the gesture (603). If motion has not yet started, the system may check to see if the chord has lifted off. If so, the dictionary display may be closed 610 (e.g., the window dismissed). If no liftoff is detected, the system may continue to check for motion and/or liftoff (607, 609) until one or the other is detected and then process the result accordingly.

Figure 9:
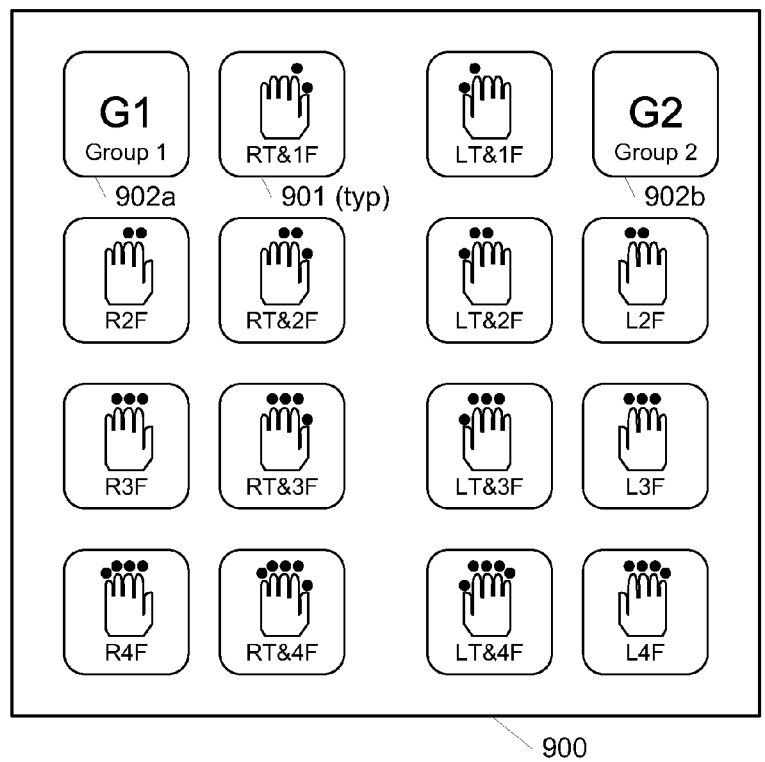
FIG. 9 illustrates a multi-touch gesture dictionary index that may be used in accordance with some embodiments of the present invention.

Although the foregoing embodiments have used a chord presented to a multi-touch interface to trigger the display of a dictionary entry, other user interaction events may be used, either in the alternative or in addition, to trigger such a display. For example, in some embodiments, multi-touch sensors may detect fingers (or other hand parts or objects) in close proximity to but not actually touching the multi-touch surface. These "hovering" fingers may be used to trigger the display of a multi-touch dictionary according to any of the foregoing embodiments. The configuration of the hovering fingers may, but need not, correspond to a particular chord. For example, hovering a thumb and one finger above the multi-touch surface may bring up a dictionary entry for the thumb and one finger chord. Alternatively, hovering fingers of any of a variety of predetermined configurations could trigger the display of dictionary index 900 as illustrated in FIG. 9.

The gesture dictionary index may include a plurality of chord icons 901. The chord icons may include a graphical depiction of the chord, e.g., the hand representation along with dots or other indications of the fingers making up the chord. The chord icons may also include a textual description or abbreviated textual description of the chord, e.g., the RT&1F indicating right ("R") thumb and one finger ("T&1F". The chord icons could also be of other designs, could provide additional or alternative chord entries, or the dictionary could be indexed in other ways. Gesture dictionary index 900 may also include one or more custom group icons 902a and 902b associated with custom dictionary entries created by the user. Selection of one of these chords would then display a dictionary entry corresponding to the chord as in the embodiments described above.

As another example, the display of a dictionary entry may be triggered by a voice command or other audible trigger. Audible triggers may be easily implemented in systems such as mobile telephones because microphones and other audio processing equipment, algorithms, etc. are already present, although audible triggers may be used in conjunction with other types of devices as well. The audible triggers may be, but need not be selected so that there is a unique audible trigger corresponding to each chord. For example, speaking the words "thumb and one finger" to the device could display a dictionary entry associated a thumb and one finger chord. Alternatively, gestures could be grouped into dictionary entries in other ways, including custom arrangements determined by the user, with a unique audible trigger for each dictionary entry. The audible trigger could also invoke the display of a gesture dictionary index, for example, like that described above with reference to FIG. 9.

Still another example of a triggering event could be the activation of buttons, or squeezing or touching a predetermined touch sensitive area of the display or another part of the device, etc. These various tactile events may be tailored to the nature and form factor of the specific device. For example, handheld computers, personal digital assistants, media players, and the like are often held in one of a user's hands and operated with the other. Such devices may be configured to have buttons or touch and/or force sensitive areas in one or more locations that correspond to the way a user could be expected to hold the device. For example, a device meant to be held in a left hand may have one or more buttons or touch sensitive areas along the right side of the device where the fingers of the user's left hand would be and/or may have one or more buttons or touch sensitive areas along the left side of the device where the thumb of the user's left hand would be, allowing the user to invoke a gesture dictionary application using the holding hand.

In some embodiments using buttons or touch or force sensitive areas to invoke a gesture dictionary application, may include mapping the buttons or touch or force sensitive areas to a particular chord. For example, a device like that described in the previous paragraph might display a thumb and one finger dictionary entry in response to a squeeze of the thumb and one finger of the user's left hand. Similarly, such a device might display a thumb and two finger dictionary entry in response to pressing a button on the left side of the device located near the user's thumb while substantially simultaneously pressing two buttons on the right side of the device located near the user's fingers. Alternatively, pressing a button could invoke the display of a gesture dictionary index, for example, that described with reference to FIG. 9 above.

Many other variations and/or combinations of the embodiments discussed herein are also possible. For example, although the descriptions herein have centered around motions of fingers and hands performed on a surface, the principles herein may be also applied to three-dimensional spatial gestures. As another example, many graphical enhancements could be applied to the displays described herein, including animations of motions associated with a particular chord or gesture, animated transitions between dictionary entries (for example, rotating cubes or other motifs), use of transparency effects to overlay the dictionary on other applications, etc. Another graphical enhancement that may be used is to have gesture dictionary entries for right-handed chords displayed on a right side of the display and entries for left-handed chords displayed on the left side of the display. It is therefore intended that the following appended claims be interpreted as including all such alterations, permutations, combinations and equivalents.

What is claimed is:

1. A method of providing to a user a dictionary of multi-touch gestures, each of the gestures comprising a chord and a motion associated with the chord, the method comprising:
   identifying a chord presented to a multi-touch interface by the user to begin a gesture, the identified chord comprising a combination of hand parts associated with the gesture but distinct from motion associated with the identified chord to complete the gesture; and
   in response to the identifying of the chord presented to begin the gesture, and prior to identifying motion associated with the identified chord to complete the gesture, displaying a dictionary entry for the identified chord, the displayed dictionary entry comprising a visual depiction of multiple motions associated with the identified chord and, for each of the multiple motions associated with the identified chord, a meaning of a gesture comprising the identified chord and the corresponding motion.

2. The method of claim 1 further comprising:
   identifying a subsequent chord presented to the multi-touch interface by the user; and
   displaying a dictionary entry for the identified subsequent chord, the dictionary entry comprising a visual depiction of one or more motions associated with the identified subsequent chord and, for each of the one or more motions associated with the identified subsequent chord, a meaning of a gesture comprising the identified subsequent chord and the motion.

3. The method of claim 1 wherein the dictionary entry comprises multiple motion icons, each motion icon including a graphical depiction of a motion and a textual description of a corresponding meaning.

4. The method of claim 3 wherein the motion icons are arranged consistently for a plurality of dictionary entries corresponding to a plurality of chords.

5. The method of claim 1 wherein the dictionary entry comprises an animation of the multiple motions.

6. The method of claim 1 further comprising:
   identifying a motion of the identified chord performed by the user; and
   providing feedback to the user indicating a gesture formed by the identified chord and the identified motion.

7. The method of claim 6 wherein the feedback includes visual feedback.

8. The method of claim 7 wherein the visual feedback includes highlighting a motion icon associated with the gesture formed by the identified chord and the identified motion.

9. The method of claim 6 wherein the feedback includes audible feedback.

10. The method of claim 9 wherein the audible feedback includes speaking a meaning of the gesture formed by the identified chord and the identified motion.

11. The method of claim 1 wherein the chord further comprises one or more modifier keys.

12. A method of providing to a user a dictionary of multi-touch gestures, each of the gestures comprising a chord and a motion associated with the chord, the method comprising:
   identifying a chord presented to a multi-touch interface by the user to begin a gesture, the identified chord comprising a combination of hand parts associated with the gesture but distinct from motion associated with the identified chord to complete the gesture, wherein the identified chord is presented during use of a non-dictionary application;
   detecting an absence of motion associated with the identified chord to complete the gesture for a predetermined period of time after the identifying of the chord presented to begin the gesture; and
   in response to the detecting of the absence of motion for the predetermined period of time, displaying a dictionary entry for the identified chord, the displayed dictionary entry comprising a visual depiction of multiple motions associated with the identified chord and, for each of the multiple motions associated with the identified chord, a meaning of a gesture comprising the identified chord and the corresponding motion.

13. The method of claim 12 further comprising:
   identifying a subsequent chord presented to the multi-touch interface by the user; and
   displaying a dictionary entry for the identified subsequent chord, the dictionary entry comprising a visual depiction of one or more motions associated with the identified subsequent chord and, for each of the one or more motions associated with the identified subsequent chord, a meaning of a gesture comprising the identified subsequent chord and the motion.

14. The method of claim 12 further comprising:
   identifying a motion of the identified chord performed by the user; and
   executing the meaning of the gesture formed by the identified chord and the identified motion.

15. The method of claim 14 further comprising:
   providing feedback to the user indicating a gesture formed by the identified chord and the identified motion.

16. The method of claim 15 wherein the feedback includes visual feedback.

17. The method of claim 16 wherein the visual feedback includes highlighting a motion icon associated with the gesture formed by the identified chord and the identified motion.

18. The method of claim 15 wherein the feedback includes audible feedback.

19. The method of claim 18 wherein the audible feedback includes speaking a meaning of the gesture formed by the identified chord and the identified motion.

20. The method of claim 12 wherein the dictionary entry comprises multiple motion icons, each motion icon including a graphical depiction of a motion and a textual description of a corresponding meaning.

21. The method of claim 20 wherein the motion icons are arranged consistently for a plurality of dictionary entries corresponding to a plurality of chords.

22. The method of claim 12 wherein the dictionary entry comprises an animation of the multiple motions.

23. The method of claim 12 wherein the chord further comprises one or more modifier keys.

24. A computer system capable of providing a dictionary of multi-touch gestures, the computer system having a multi-touch interface, a graphical user interface, and a computer memory encoded with executable instructions causing the computer system to:
    identify a chord presented to the multi-touch interface by a user to begin a gesture, the identified chord comprising a combination of hand parts associated with the gesture but distinct from motion associated with the identified chord to complete the gesture; and
    in response to the identifying of the chord presented to begin the gesture, and prior to identifying motion associated with the identified chord to complete the gesture, display a dictionary entry for the identified chord, the displayed dictionary entry comprising a visual depiction of multiple motions associated with the identified chord and, for each of the multiple motions associated with the identified chord, a meaning of a gesture comprising the identified chord and the corresponding motion.

25. The computer system of claim 24 wherein the computer system is selected from the group consisting of a desktop computer, a tablet computer, and a notebook computer.

26. The computer system of claim 24 wherein the computer system comprises at least one of a handheld computer, a personal digital assistant, a media player, and a mobile telephone.

27. The computer system of claim 24 wherein the dictionary entry comprises multiple motion icons, each motion icon including a graphical depiction of a motion and a textual description of a corresponding meaning.

28. The computer system of claim 27 wherein the motion icons are arranged consistently for a plurality of dictionary entries corresponding to a plurality of chords.

29. The computer system of claim 24 wherein the dictionary entry comprises an animation of the multiple motions.

30. The computer system of claim 24 wherein the executable instructions further cause the computer to:
    identify a motion of the identified chord performed by the user; and
    provide feedback to the user indicating a gesture formed by the identified chord and the identified motion.

31. The computer system of claim 30 wherein the feedback includes visual feedback.

32. The computer system of claim 31 wherein the visual feedback includes a highlighted motion icon associated with the gesture formed by the identified chord and the identified motion.

33. The computer system of claim 30 wherein the feedback includes audible feedback.

34. The computer system of claim 33 wherein the audible feedback includes a spoken meaning of the gesture formed by the identified chord and the identified motion.

35. The computer system of claim 24 wherein the chord further comprises one or more modifier keys.

36. A computer system capable of providing a dictionary of multi-touch gestures, the computer system having a multi-touch interface, a graphical user interface, and a computer memory encoded with executable instructions causing the computer system to:
    identify a chord presented to the multi-touch interface by a user to begin a gesture, the identified chord comprising a combination of hand parts associated with the gesture but distinct from motion associated with the identified chord to complete the gesture, wherein the identified chord is presented during use of a non-dictionary application;
    detect an absence of motion associated with the identified chord to complete the gesture for a predetermined period of time after the identifying of the chord presented to begin the gesture; and
    in response to the detecting of the absence of motion for the predetermined period of time, display a dictionary entry for the identified chord, the displayed dictionary entry comprising a visual depiction of multiple motions associated with the identified chord and, for each of the multiple motions associated with the identified chord, a meaning of a gesture comprising the identified chord and the corresponding motion.

37. The computer system of claim 36 wherein the computer system is selected from the group of a desktop computer, a tablet computer, and a notebook computer.

38. The computer system of claim 36 wherein the computer system comprises at least one of a handheld computer, a personal digital assistant, a media player, and a mobile telephone.

39. The computer system of claim 36 wherein the dictionary entry comprises multiple motion icons, each motion icon including a graphical depiction of a motion and a textual description of a corresponding meaning.

40. The computer system of claim 39 wherein the motion icons are arranged consistently for a plurality of dictionary entries corresponding to a plurality of chords.

41. The computer system of claim 36 wherein the dictionary entry comprises an animation of the multiple motions.

42. The computer system of claim 36 wherein the executable instructions further cause the computer to:
    identify a motion of the identified chord performed by the user; and
    execute the meaning of the gesture formed by the identified chord and the identified motion.

43. The computer system of claim 42 wherein the executable instructions further cause the computer to provide feedback to the user indicating a gesture formed by the identified chord and the identified motion.

44. The computer system of claim 43 wherein the feedback includes visual feedback.

45. The computer system of claim 44 wherein the visual feedback includes a highlighted motion icon associated with the gesture formed by the identified chord and the identified motion.

46. The computer system of claim 43 wherein the feedback includes audible feedback.

47. The computer system of claim 46 wherein the audible feedback includes a spoken meaning of the gesture formed by the identified chord and the identified motion.

48. The computer system of claim 36 wherein the chord further comprises one or more modifier keys.

49. A mobile telephone capable of providing a dictionary of multi-touch gestures, the mobile telephone having a multi-touch interface and a graphical user interface, wherein the mobile telephone includes a memory encoded with executable instructions causing the mobile telephone to:
    identify a chord presented to the multi-touch interface by a user to begin a gesture, the identified chord comprising a combination of hand parts associated with gesture but distinct from motion associated with the identified chord to complete the gesture; and
    in response to the identifying of the chord presented to begin the gesture, and prior to identifying motion associated with the identified chord to complete the gesture, display a dictionary entry for the identified chord, the displayed dictionary entry comprising a visual depiction of multiple motions associated with the identified chord and, for each of the multiple motions associated with the identified chord, a meaning of a gesture comprising the identified chord and the corresponding motion.

50. The mobile telephone of claim 49 wherein the dictionary entry comprises multiple motion icons, each motion icon including a graphical depiction of a motion and a textual description of a corresponding meaning.

51. The mobile telephone of claim 49 wherein the dictionary entry comprises an animation of the multiple motions.

52. The mobile telephone of claim 49 wherein the executable instructions further cause the computer to:

identify a motion of the identified chord performed by the user; and provide feedback to the user indicating a gesture formed by the identified chord and the identified motion.

53. The mobile telephone of claim 52 wherein the feedback includes visual feedback comprising a highlighted motion icon associated with the gesture formed by the identified chord and the identified motion.

54. The mobile telephone of claim 52 wherein the feedback includes audible feedback comprising a spoken meaning of the gesture formed by the identified chord and the identified motion.

55. The computer system of claim 49 wherein the chord further comprises one or more modifier keys.

* * * * *

UNITED STATES PATENT AND TRADEMARK OFFICE
CERTIFICATE OF CORRECTION

| | | |
|---|---|---|
| PATENT NO. | : 7,840,912 B2 | Page 1 of 1 |
| APPLICATION NO. | : 11/619553 | |
| DATED | : November 23, 2010 | |
| INVENTOR(S) | : John Greer Elias et al. | |

It is certified that error appears in the above-identified patent and that said Letters Patent is hereby corrected as shown below:

In column 1, line 40, delete "interfaces"," and insert -- interfaces"), --, therefor.

In column 10, line 14, delete ""T&1F"." and insert -- ("T&1F"). --, therefor.

Signed and Sealed this

Twenty-fifth Day of October, 2011

David J. Kappos
*Director of the United States Patent and Trademark Office*